United States Patent [19]
Hare

[11] 3,796,231
[45] Mar. 12, 1974

[54] SINGLE HANDLE FAUCET VALVE

[76] Inventor: Terence G. Hare, 22600 Middlebelt G11, Farmington, Mich. 48024

[22] Filed: Mar. 20, 1972

[21] Appl. No.: 236,079

[52] U.S. Cl.............................. 137/625.4, 137/636.3
[51] Int. Cl............................................. F16k 11/00
[58] Field of Search............. 137/636.3, 625.4, 636, 137/636.1, 636.2; 251/309, 315

[56] References Cited
UNITED STATES PATENTS

| | | | |
|---|---|---|---|
| 3,623,510 | 11/1971 | Hare et al.................. | 137/614.17 X |
| 3,167,086 | 1/1965 | Michalski................... | 137/625.41 X |
| 3,526,250 | 9/1970 | Miller.......................... | 137/636.3 X |
| 3,472,279 | 10/1969 | Sanderson................... | 137/636.3 X |
| 3,506,036 | 4/1970 | Hare.............................. | 137/636.3 |
| 3,667,503 | 6/1972 | Farrell et al...................... | 137/625.4 |
| 3,693,660 | 9/1972 | Wheelock......................... | 137/625.4 |

*Primary Examiner*—Samuel Scott
*Attorney, Agent, or Firm*—Barnes, Kisselle, Raisch & Choate

[57] ABSTRACT

The single handle faucet disclosed herein comprises a faucet body which has a pair of inlets for hot and cold water and a liquid outlet. A spherical valve body is mounted for swinging movement within the body and has a spherical surface that is complementary to a similar compressible spherical surface on the faucet body. The valve body has passages extending from the spherical surface of the valve body. The passages of the valve body and the passages of the faucet body are adapted to be selectively aligned.

22 Claims, 8 Drawing Figures

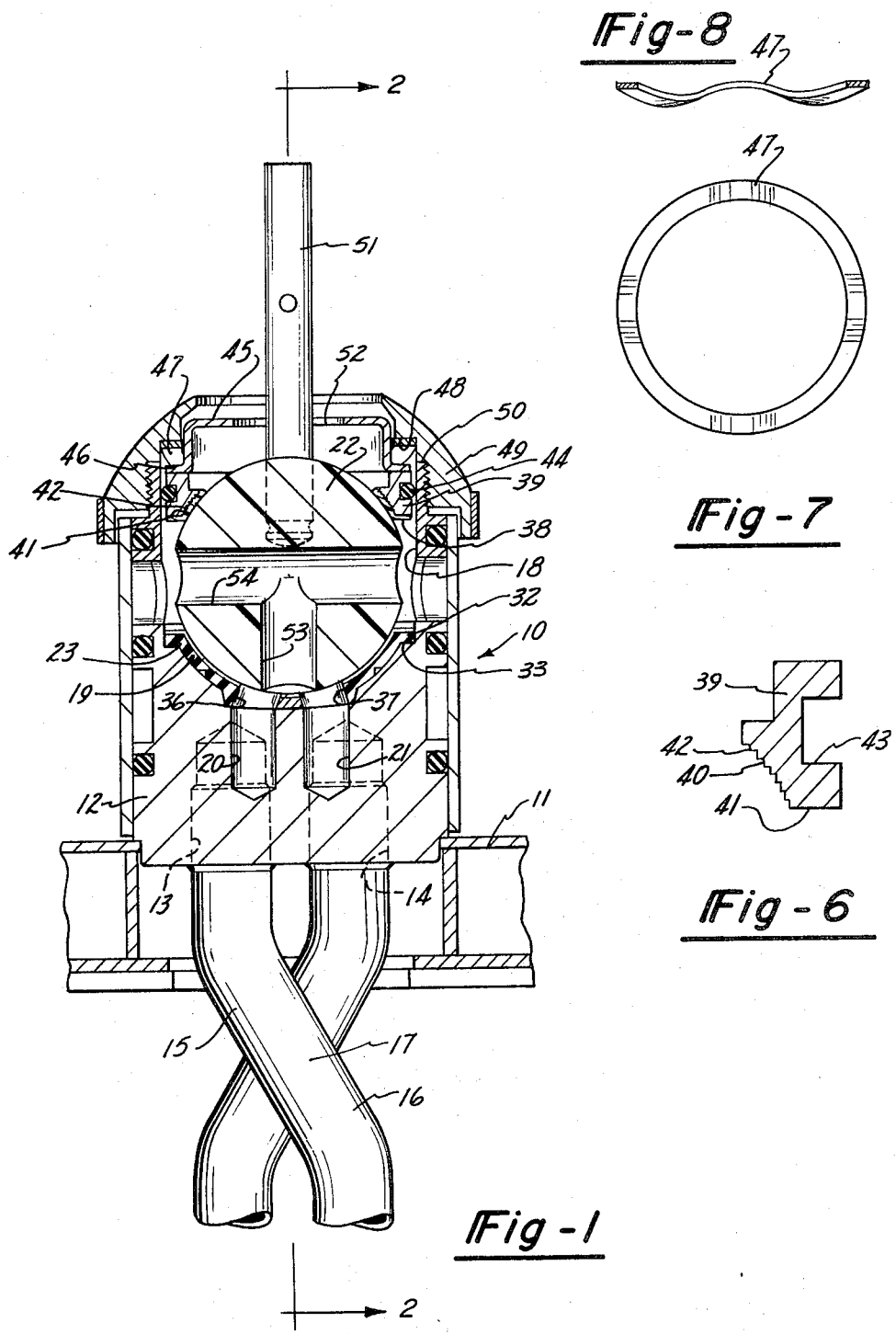

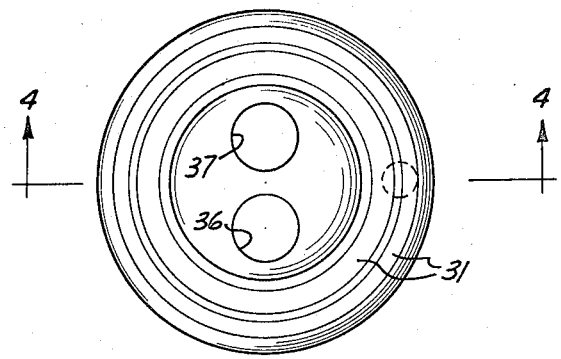
Fig-3
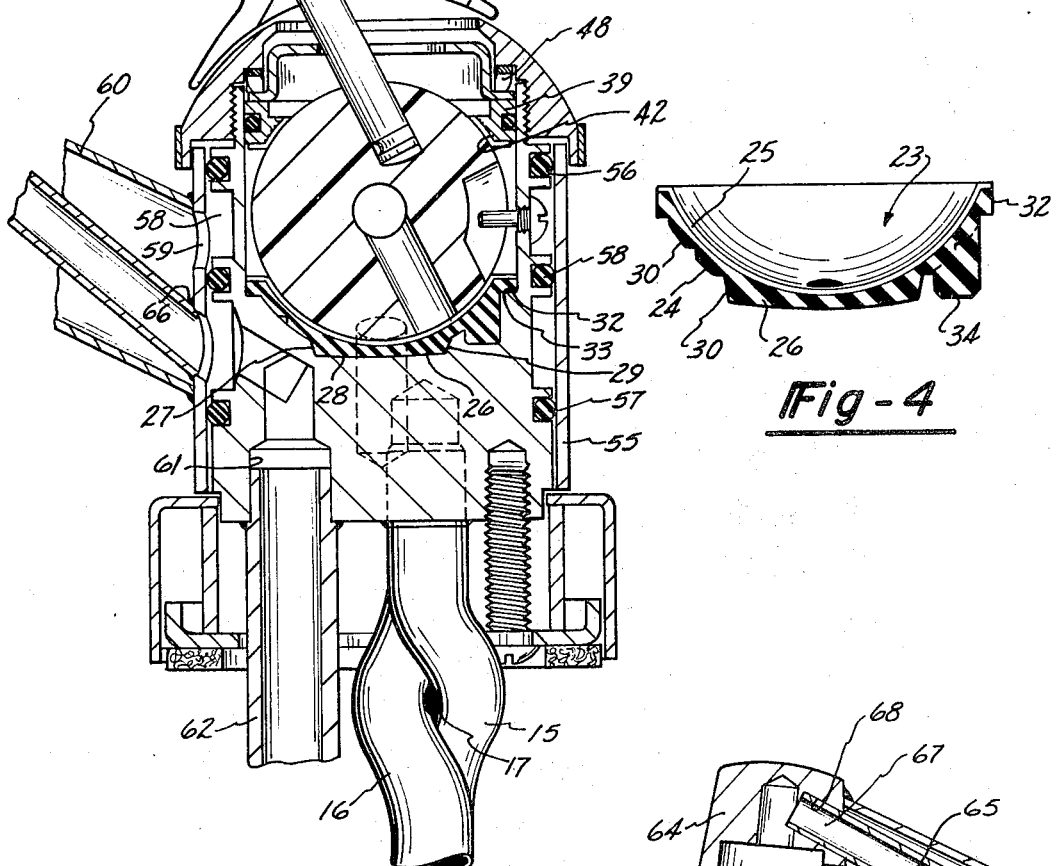
Fig-2
Fig-4
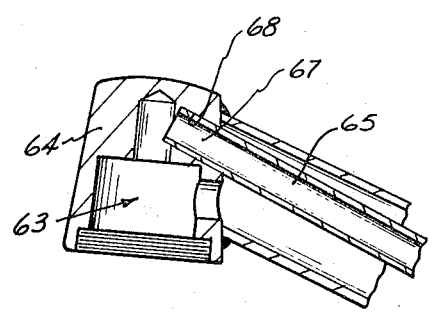
Fig-5

3,796,231

SINGLE HANDLE FAUCET VALVE

This application discloses and claims subject matter disclosed in the copending application Ser. No. 201,347, filed Nov. 23, 1971, now U.S. Pat. No. 3,747,641, issued July 24, 1973, titled Single Handle Faucet Valve of Terence G. Hare and Hugh McCormick.

This invention relates to water faucets and particularly to single handle faucets.

BACKGROUND OF THE INVENTION

In the faucet art it is common to have what is known as a single handle faucet wherein manipulation of a single handle controls both the degree of mixture of hot and cold water as well as the volume of water which is emitted.

In U.S. Pat. No. 3,506,036, dated Apr. 14, 1970 of Terence G. Hare, there is disclosed and claimed a single handle faucet which comprises a faucet body which has a pair of inlets for hot and cold water and a liquid outlet. A valve body is mounted for swinging movement in a single plane within the faucet body and has a spherical surface that is complementary to a similar compressible spherical surface on the faucet body. The valve body has a valve seat therein and passages extend from the spherical surface of the valve body to the valve seat. A valve stem is mounted within the valve body and supports a bib which is movable toward and away from the valve seat. In one form, seals are provided on the valve and comprise spaced annular sealing members between the valve body and faucet body. In another form, the seals comprise a first annular sealing member and a spherical sealing member interposed between the spherical surface of the valve and the valve body.

In the copending application Ser. No. 844,869, filed July 25, 1969, U.S. Pat. No. 3,623,510, issued Nov. 30, 1971, titled Single Handle Faucet Valve of Terence G. Hare and Hugh McCormick, there is disclosed an improved single handle faucet that has a novel seal arrangement which minimizes any tendency for cross flow between the passages of the faucet body.

Among the objects of this invention are to provide a single handle faucet valve wherein said selective control is achieved without the use of a valve stem; wherein the valve can be constructed at low cost; wherein improved sealing is provided between the valve body and faucet body; wherein leakage between the hot and cold inlets is eliminated and entirely avoided; wherein specific provision is made for supplying sufficient water to a diverter for, in turn, supplying a spray attachment; and to provide a modified form of faucet valve wherein selective control is achieved without the use of a valve stem.

SUMMARY

The single handle faucet disclosed herein comprises a faucet body which has a pair of inlets for hot and cold water and a liquid outlet. A valve body is mounted for swinging movement within the faucet body and has a spherical surface that is complementary to a similar compressible spherical surface on the faucet body. The valve body has passages which extend from the spherical surface of the valve body. The passages of the valve body and the passages of the faucet body are adapted to be selectively aligned. Seals are provided on the valve. A spherical compressible sealing surface is provided by a resilient body having a spherical relatively incompressible layer of a low friction material thereon which is dimensionally stable and resistant to hot water. The resilient body has a thickened portion in the area of the inlets of the faucet body which thickened portion extends into a recess of the faucet body. The faucet body further includes novel passages permitting free flow of water therethrough. The faucet valve further includes a novel configuration of the resilient body and a novel arrangement for controlling the sealing pressure between the resilient body and the valve body.

DESCRIPTION OF THE DRAWINGS

FIG. 1 is a fragmentary part sectional view of a faucet embodying the invention.

FIG. 2 is a fragmentary sectional view taken along the line 2—2 in FIG. 1.

FIG. 3 is a bottom plan view of one of the sealing members.

FIG. 4 is a sectional view taken along the line 4—4 in FIG. 3.

FIG. 5 is a sectional view of a portion of the faucet.

FIG. 6 is a fragmentary sectional view on an enlarged scale of a portion of the faucet valve.

FIG. 7 is a plan view of another part of the faucet valve.

FIG. 8 is a sectional view of the part shown in FIG. 7.

DESCRIPTION

Referring to FIGS. 1 and 2, the faucet 10 is adapted to be mounted on a sink 11 or the like, as presently described. The faucet 10 comprises a faucet body 12 which has spaced vertical inlets 13, 14 in the lower end thereof into which pipes 15, 16 extend. For reasons presently apparent, the pipes 15, 16 cross one another intermediate their ends as at 17 in order that the hot and cold water can be supplied thereto in accordance with conventional code requirements. Body 12 is formed with a cylindrical cavity 18 that has an open upper end. The lower wall of the cavity is formed with a generally spherical surface 19. Passages 13, 14 communicate through passageways 20, 21 with the surface 19. A spherical valve body 22 which has a spherical lower end extends into the cavity 18 with the spherical surface thereof engaging a spherical seating surface on a sealing member 23 (FIG. 4).

As shown in FIGS. 1 – 4, sealing member 23 comprises a body 24 of rubber or other similar resilient material and a layer 25 of relatively incompressible dimensionally stable low friction material bonded to the upper surface thereof. A satisfactory material comprises Teflon. As shown in FIG. 4, the sealing member 23, and particularly the rubber body 24 thereof, includes a central thickened portion 26 which is generally circular and extends into a complementary recess 27, the bottom surface 28 of the recess being generally concave. The recess 27 has outwardly tapered side walls 29 against which complementary walls 30 of the thickened portion 26 engage. The portion of the rubber body 24 surrounding the thickened portion 26 is formed with annular serrations 31 surrounding the portion 26 in order that the body may have better resilient sealing contact with the spherical portion of the surface 19. The sealing member 23 also includes a peripheral lip 32 that engages a complementary shoulder 33 on the faucet body 12. Finally, the rubber body 24 of the sealing member 23 includes a small axial projection 34, radially outwardly beyond thickened portion 26 that extends into a complementary opening 35 to circumferentially locate the sealing member and thereby align openings 36, 37 therein with the upper ends of the passageways 20, 21.

An annular seal 38 which has a generally obtuse angle cross section in the untensioned state is provided adjacent the upper end of the spherical portion 22 and is urged into sealing contact therewith by a collar 39 that extends into the cylindrical cavity 18 and has surfaces 40, 41 that extend upwardly and inwardly and horizontally, respectively, to engage the surfaces of the seal 38 and urge the inclined surface against the surface of the spherical member 22. The surface of collar 39 which engages the seal 38 has annular ribs 42 thereon which firmly grip the seal 38 and urge it against the spherical surface of the valve body 22. The collar 39 is formed with an annular groove 43 in which an O-ring 44 is seated to provide a seal between the seal collar 39 and the wall of the cavity 17.

A guide ring 45 extends within the cavity 17 over the seal collar 39. Guide ring 45 includes a peripheral flange 46 that engages the upper end of the seal collar 39. A flat sinuous annular spring 47 is interposed between a shoulder 48 on faucet nut 49 and flange 46. Faucet nut 49 is threaded on the upper end of the valve body 12 and holds the guide ring 45 and, in turn, the collar 39 in position to, in turn, cause the seal 38 to engage the surface of the spherical portion of the valve body 22 and urge it toward surface 25. When the faucet nut 49 is rotated, a shoulder 50 thereon engages the upper end of the faucet body 12 limiting the axial movement of the nut 49 onto the body 12 and as a result the pressure with which the seal ring 39 is held against the valve body 22 is controlled.

The valve ball 22 includes a generally cylindrical rod 51 which is D-shaped in cross section. The lower end of rod 51 is embedded in valve body 22 and the rod 51 extends upwardly through a generally triangular opening 52 in the guide ring 45.

The seal 38 is preferably made of a low friction material which is resistant to hot water and is dimensionally stable. A satisfactory material comprises Teflon. The valve body 22 is also preferably made of a low friction dimensionally stable material that is resistant to hot water and is different from material of seals 38, 23. A satisfactory material comprises a phenyline oxide type such as made by General Electric Company, Pittsfield, Massachusetts, and sold under the trademark, NORYL.

Referring to FIGS. 1, 4, 5 and 6, the spherical valve body 22 includes a single passage 53 which extends radially inwardly from the surface 22. The passage 53 communicates with a diametral passage 54 that extends from the upper end of the passage radially outwardly to the periphery of the valve body 22 at a right angle to the axis of the passage 53. The construction is such that the valve body 22 can be molded in a single integral piece. The arrangement is such that the valve body 22 is substantially symmetrical so that differential shrinkage is minimized in a single piece.

Referring to FIGS. 1 and 2, a cylindrical sheet metal sleeve 55 is rotatably mounted and surrounds the body 12 with O-rings 56–58, in annular recesses in the body engaging the interior of the sleeve to provide a seal. Water can flow outwardly into a space 58 between the valve body 12 and the sleeve 55 and through an opening 59 in sleeve 55 to the spout 60 on sleeve 55.

Referring to FIG. 2, the faucet body 12 further includes an axial diverter passage 61 into which a tube diverter 62 extends. The diverter tube 62 includes an on/off valve and spray head on the end thereof (not shown) which upon depression, causes a diverter valve 63 of conventional construction in the end 64 of the spout 60 to be actuated so that the water is diverted from the spout 60 to a return tube 65 to the area adjacent the upper end of the passage and in turn to the diverter tube 62. In the construction shown, the return tube 65 in the spout 60 has a flared portion 66 spaced from one end engaging the metal sleeve 55. The other end 67 extends into a recess 68 in body 64 on the end of the spout so that no soldering is needed to retain the internal tube in position.

By swinging the knob and, in turn, the valve body 22, the degree of registry of opening with respect to passages 20, 21 may be controlled; the extent of registry determining the relative amounts of hot and cold water which are delivered to the passage.

It has been found that the provision of a tapered wall 30 on the thickened portion or projection 26 of the sealing member 23 as well as a complementary tapered wall 29 on the recess 27 permits a more ready achievement of sealing when the faucet is assembled since the complementary tapered surfaces 29, 30 facilitate interengagement and movement of the sealing member 23 into sealing position. Thus, the degree of force required to tighten the nut 49 is lessened and a better seal is insured. Furthermore, the configuration of the projection 26 and recess 27 minimize any tendency of the rubber body 24 of the sealing member 23 to move outwardly out of the recess 27 when the nut 49 is tightened.

By providing a stop against which the nut 49 is tightened, together with the spring 47 interposed between the nut 49 and the seal 38, a uniform sealing pressure is provided each and every time that the faucet is assembled or disassembled and overtightening with resultant damage to the parts is eliminated.

The provision of a single passage 53 in the valve body 22 results in a construction wherein the passage is at all times in overlying relationship to the thickened portion 26 of the sealing member 23. As a result, there is no variation in sealing pressure as the valve body 22 is manipulated with respect to the faucet body 12. This insures the same sealing pressure under all water conditions and assists in proper maintenance of the seals since there is no fluctuation or change in the sealing pressure as the valve body is manipulated.

As heretofore stated, by providing a substantially symmetrical valve body 22, the manufacture of the valve body 22 is facilitated and in addition the valve body 22 has a longer life since it is substantially symmetrical and therefore there are no unbalanced forces in use.

Spring 47 also acts as a resilient member allowing body 22 to move slightly in any direction to conform to any shrinkage imperfections in the molding of the body 22. Thus providing better sealing and ease of operation.

I claim:

1. In a single handle faucet, the combination comprising a faucet body, said faucet body having a pair of liquid inlets for hot and cold water and a liquid outlet, said faucet body having a generally spherical surface, a sealing member mounted on said surface and having a centrally located axially thickened portion, said faucet body having a complementary recess into which said thickened portion of said sealing member extends, said thickened portion and said recess into which said thickened portion extends having complementary tapered peripheral surfaces, said faucet body having passages extending from said inlets to said recess in said faucet body, said sealing member having openings through said thickened portion aligned with the passages in said faucet body, a valve body mounted for swinging movement within said faucet body, said valve body having a spherical surface complementary to said spherical surface on said sealing member, said valve body having passage means extending from one area on the periphery of said spherical surface of said valve body to another area of the periphery thereof to said valve seat, one end of said passage means terminating along said spherical surface such that said passage means is adjacent said thickened portion of said sealing member in all portions of said valve body, and means for guiding said valve body to selectively change the communication of the passage means in the valve body with the inlets of said faucet body.

2. The combination set forth in claim 1 including a plurality of ribs surrounding said thickened portion.

3. The combination set forth in claim 1 wherein said valve body includes a single passage overlying said spaced passages in said thickened portion of said sealing member.

4. The combination set forth in claim 1 wherein said valve body includes a diametral opening extending therethrough and a single passage extending radially and intersecting said diametral opening.

5. The combination set forth in claim 1 wherein the peripheral wall of said thickened portion and said recess in said faucet body taper radially outwardly.

6. The combination set forth in claim 5 wherein the angle of taper is more axial than transverse with respect to the faucet body.

7. The combination set forth in claim 1 including a second sealing member on another portion of said valve body, a locking member mounted on said faucet body, and a spring interposed between said locking member and said second sealing member, means limiting the movement of said locking member on said faucet body whereby there is a predetermined spring pressure of said second sealing member on said valve body urging said valve body against said first sealing member such that the valve body is urged into a predetermined pressure against said first sealing member.

8. The combination set forth in claim 7 including a guide member interposed between said second sealing member and said spring.

9. The combination set forth in claim 7 wherein said spring comprises a sinuous spring having spaced substantially flat surfaces engaging said second sealing member at circumferentially spaced points.

10. The combination set forth in claim 7 wherein said locking member comprises a member threaded on said faucet body and interengaging surfaces between said member and said faucet body limiting the extent of axial movement of said member onto said faucet body.

11. In a single handle faucet, the combination comprising a faucet body, said faucet body having a pair of liquid inlets for hot and cold water and a liquid outlet, said faucet body having a generally spherical surface, a sealing member mounted on said surface and having a centrally located generally circular axially thickened portion, said faucet body having a complementary recess into which said thickened portion of said sealing member extends, said thickened portion and said recess into which said thickened portion extends having complementary tapered peripheral surfaces, said faucet body having passages extending from said inlets to said recess in said faucet body.

12. The combination set forth in claim 11 including a plurality of ribs surrounding said thickened portion.

13. The combination set forth in claim 11 including a layer of relatively incompressible dimensionally stable low friction plastic material on said sealing member, said sealing member having an axial projection thereon, said faucet body having an opening into which said projection extends.

14. The combination set forth in claim 11 wherein the peripheral wall of said thickened portion and said recess in said faucet body taper radially outwardly.

15. The combination set forth in claim 14 wherein the angle of taper is more axial than transverse with respect to the faucet body.

16. A sealing member for a single handle faucet valve comprising a body of resilient material, said body having a centrally located axially thickened portion, the periphery of said thickened portion being tapered radially outwardly, one surface of said portion having a concave spherical surface, a layer of relatively incompressible dimensionally stable low-friction plastic material on said spherical surface of said sealing member, said sealing member and said layer having spaced openings extending through the axially thickened portion thereof and said layer.

17. The combination set forth in claim 16 wherein the angle of taper is more axial than transverse with respect to the axis of said sealing member.

18. The combination set forth in claim 17 including a plurality of ribs surrounding said thickened portion.

19. In a single handle faucet, the combination comprising a faucet body, said faucet body having a pair of liquid inlets for hot and cold water and a liquid outlet, said faucet body having a generally spherical surface, a sealing member mounted on said surface and having a centrally located axially thickened portion, said faucet body having a complementary recess into which said thickened portion of said sealing member extends, said faucet body having passages extending from said inlets to said recess in said faucet body, said sealing member having openings through said thickened portion aligned with the passages in said faucet body, a plastic valve body mounted for swinging movement within said faucet body, said valve body having a spherical surface complementary to said spherical surface on said sealing member, said valve body having passage means extending from one area on the periphery of said spherical surface of said valve body to another area of the periphery thereof to said valve seat, one end of said passage means terminating along said spherical surface such that said passage means is adjacent said thickened portion of said sealing member in all portions of said valve body, and means for guiding said valve body to selectively change the communication of the passage means in the valve body with the inlets of said faucet body, a second sealing member on another portion of said valve body, said second sealing member having at least limited lateral movement relative to said first sealing member, a locking member mounted on said faucet body, and a spring interposed between said locking member and said second sealing member, means limiting the movement of said locking member on said faucet body whereby there is a predetermined spring pressure of said second sealing member on said valve body.

20. The combination set forth in claim 19 including a member interposed between said second sealing member and said spring.

21. The combination set forth in claim 19 wherein said spring comprises a sinuous spring having spaced substantially flat surfaces.

22. The combination set forth in claim 19 wherein said locking member comprises a member threaded on said faucet body and interengaging surfaces between said member and said faucet body limiting the extent of axial movement of said member onto said faucet body.

* * * * *